United States Patent [19]

Underwood, IV et al.

[11] Patent Number: 4,959,554

[45] Date of Patent: Sep. 25, 1990

[54] DUAL INPUT-DUAL OUTPUT ELECTRIC SWITCH

[76] Inventors: Joseph W. T. Underwood, IV, 4322 Tidewater Dr., Jacksonville, Fla. 32250; Eugene F. Rockafeller, P.O. Box 817, Big Pine Key, Fla. 33043

[21] Appl. No.: 348,908

[22] Filed: May 8, 1989

[51] Int. Cl.[5] .......................... H01I 19/58; H02J 1/00

[52] U.S. Cl. .................................... 307/38; 200/11 B; 200/11 D; 200/11 J

[58] Field of Search ................ 200/11 B, 11 D, 11 G, 200/11 TW, 11 J; 307/115, 38; 320/2, 7, 29

[56] References Cited

U.S. PATENT DOCUMENTS

| | | | |
|---|---|---|---|
| 2,106,054 | 1/1938 | Leighton | 200/11 D |
| 2,451,248 | 10/1948 | Slatin | 200/11 B |
| 2,554,724 | 5/1951 | Williams | 200/11 D |
| 2,976,379 | 3/1961 | Rhodes | 200/11 B X |
| 3,174,000 | 3/1965 | Golbeck | 200/11 D |
| 3,248,488 | 4/1966 | Stephan | 200/11 D |
| 3,467,792 | 9/1969 | Allison | 200/11 D |
| 3,718,848 | 2/1973 | Hines | 200/11 B X |
| 3,742,170 | 6/1973 | Topper | 200/11 B X |
| 4,267,460 | 5/1981 | Habighorst | 307/115 X |

*Primary Examiner*—J. R. Scott

*Attorney, Agent, or Firm*—Arthur G. Yeager

[57] ABSTRACT

An electric switch having a disc which is rotatable to any of several indexed positions, the disc having two generally semicircular conductive sectors rigidly attached to the disc and electrically insulated from each other; a plurality of stationary terminals, one of which is in continuous sliding contact with one of the sectors, one of which is in continuous sliding contact with the other sector, and the remaining terminals are in discontinuous sliding contact with one or the other of the sectors; the sectors being shaped to eliminate electrical contact with selected terminals at selected indexed positions of the disc.

11 Claims, 4 Drawing Sheets

DUAL INPUT-DUAL OUTPUT ELECTRIC SWITCH

BACKGROUND OF THE INVENTION

There are certain electrical systems having a plurality of power sources and a plurality of power consuming devices that require switches to connect the power sources to the consuming devices in any desired order. A specific system having these requirements is the electrical system of a boat needing D.C. power to start the engine and D.C. power to operate the radio, navigational devices, etc. If the boat has only one bank of batteries, or two banks selectable by use of a conventional marine battery selector switch for these tasks, it frequently occurs that starting the engine draws so much power from the batteries that the high-tech microprocessor-controlled navigational components are temporarily without power due to the voltage drop, causing the memory systems of the components to die. Generally, this situation is avoided by using at least two sources of power, one of which is dedicated to provide the engine starting power and the other is used for the electrical/ electronic equipment on board. This, of course, requires that two banks of batteries be kept fully operational at all times. If one bank loses its power, the equipment it energizes is left useless and there is no reserve power unless the leads are changed so as to utilize the fully charged batteries for energizing devices not intended to be served by those charged batteries. This problem is discussed in "Practical Sailor", Jan. 15, 1989, Vol. 15, No. 2, where the solutions suggested are to use two battery selector switches to isolate the loads, thus providing a separate battery for the electronic equipment, called "loran", or to build a complicated electronic circuit including a diode/ capacitor time sensitive surge arrester arrangement (although this will not provide the protection, if the engine starting takes a long time).

It is an object of this invention to provide a single hand-operated switch which can directly replace existing conventional marine battery switches and can be mounted any place convenient to the operator and connected to the electrical system so as to provide separate circuits for the engine starter and the electronic equipment using separate sources of power, and yet can be switched to use any source for any consuming device. Furthermore, for emergencies, the switch can connect all power sources to all power consuming devices or either source to both consuming devices, particularly useful when a bank of batteries fails.

It is another object to provide such a switch which will handle large current loads, while being vapor-proof and spark-proof. Still other objects will be evident from the more detailed description which follows.

BRIEF SUMMARY OF THE INVENTION

This invention relates to an electric vapor-proof, spark-proof, switch having a rotatable insulater disc having two isolated conductive plates, two pair of stationary current input terminals selectively engagable with said plate, two stationary current output terminals continuously engaged respectively with one of said plates, an indicator to identify positions of said disc wherein selected input terminals are electrically connected to selected output terminals, and a means for rotating said disc to any of said positions.

In specific and preferred embodiments the rotatable disc includes a central portion of nonconductive material to which are rigidly fixed two generally semicircular conductive metal members fashioned with circumferentially spaced cut out-portions to eliminate current conduction at selected positions of the disc.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
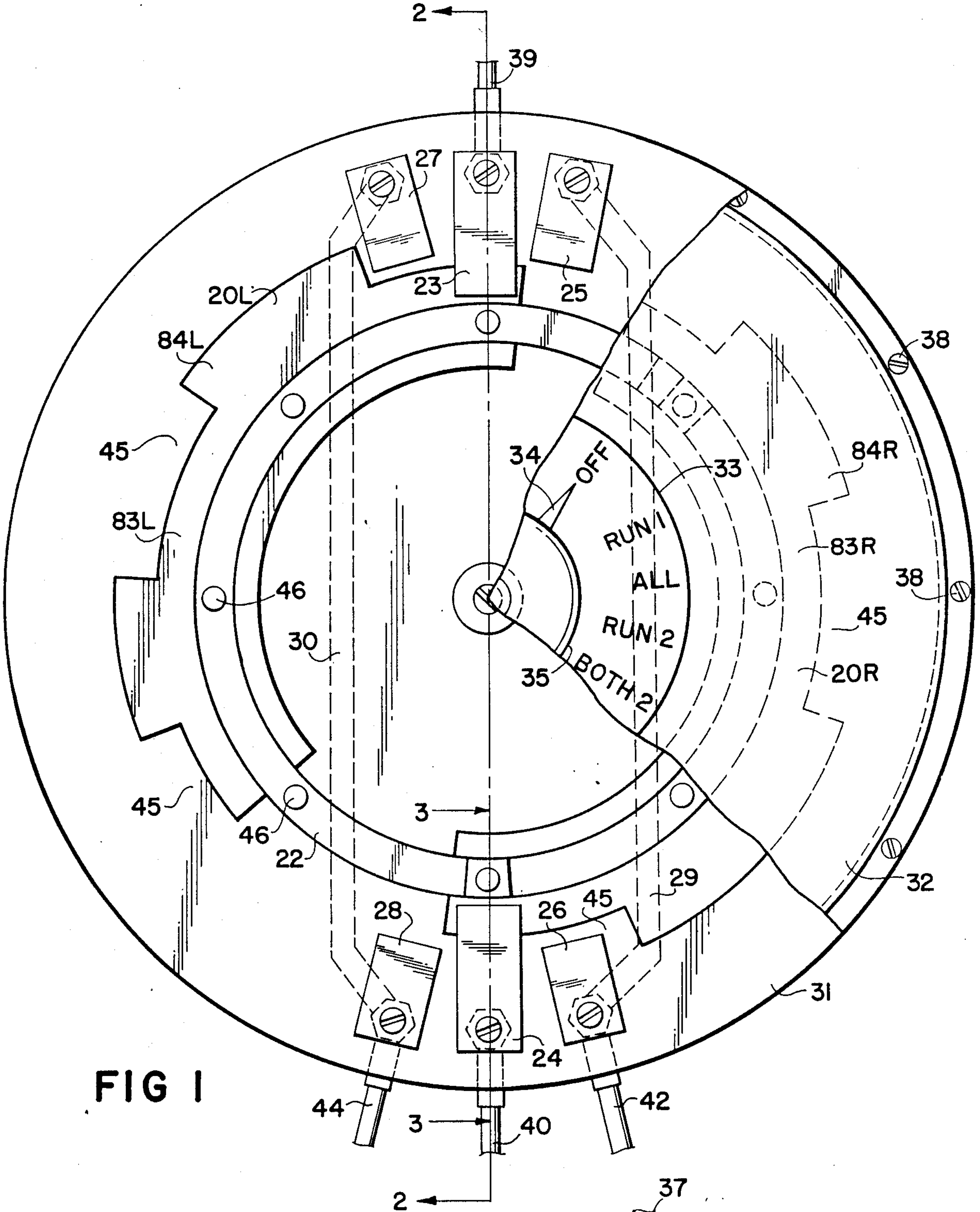
FIG. 1 is a top plan view, partially broken away to see the interior, of one embodiment of this invention.
Figure 3:
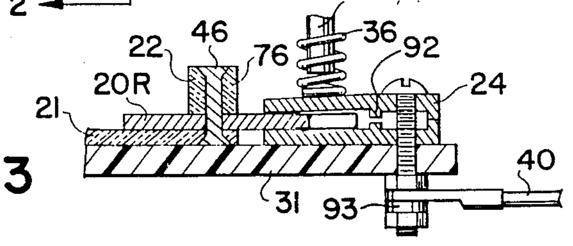
FIG. 3 is an enlarged cross sectional view taken at 3—3 of FIG. 1.
Figure 2:
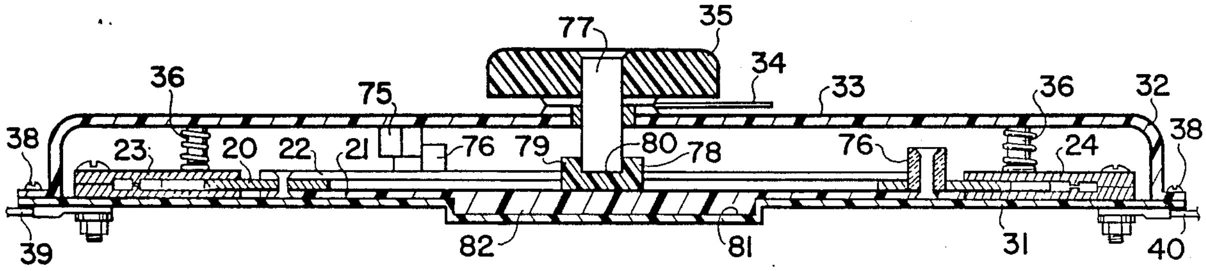
FIG. 2 is a cross sectional view taken at 2—2 of FIG. 1.

The electric switch of this invention can best be understood by reference to the drawings. In FIGS. 1-3 there is depicted one embodiment, the preferred embodiment, of this invention.

A two-piece nonconductive housing comprising a disc-shaped base member 31 and a dished cover 32 which fasten together by an adhesive or by screws and bolts 38 around a peripheral flange. In the center of base member 31 is a circular recess 81 which serves as a large bearing support for disc 20 which has a boss 82 projecting downwardly from disc 20 and shaped to fit snugly into recess 81. Disc 20 is rotatable and therefore boss 82 and recess 81 may be lubricated or made with low friction materials, such as "Teflon" at the interfaces of recess 81 and boss 82.

Shaft 77 is rigidly affixed to disc 20 perpendicular thereto and placed at the central axis of disc 20. Shaft 77 extends upwardly through cover 32 and has a knob 35 attached to shaft 77 to make disc 20 rotatable by hand manipulation of knob 35. The lower end of shaft 77 is shaped to function as a key 80 to fit into a corresponding keyway 79 in a boss 78 affixed to disc 20. Disc 20 actually has several component parts rigidly fastened to each other. Disc support 21 is a reinforced circular sheet of nonconductive material to which is attached boss 78 at the center and two conductive metal plate members 20L and 20R by means of a nonconductive clamping ring 22 and rivets 46 or other fastening means such as screws, adhesive, or the like. The entire disc 21 and its component parts as described above is rotatable by twisting knob 35 in either direction between "OFF" position and "BOTH 1" position with stops 89R, 89L, 90R, and 90L to prevent disc 21 from being rotated beyond these end positions. Plate members 20L and 20R are separate pieces that are insulated from each other by reason of the nonconductive nature of support 21 and ring 22. Plate members 20L and 20R are shaped with certain cut out portions 45, leaving members 20L and 20R to be a plurality of truncated sectors of a circle joined side-to-side. Another way of looking at members 20L and 20R is that both are combinations of two generally semicircular rings, an inner continuous ring 83L and 83R and an outer discontinuous ring 84L and 84R, respectively. Members 20L and 20R typically are copper plate e.g., about 0.05–0.25 inch thick, although any material is suitable that is a good electrical conductor and is rigid. Members 20L and 20R serve to conduct electricity from one terminal to another terminal.

Positioned in circumferentially spaced relationship to each other are terminals 23–28 which contact plate members 20L or 20R slidingly. Output terminals 23 and 24 conduct electricity from plate members 20L or 20R to power consuming devices such as engine starting motors, radio, telephone, lights, radar, satellite navigational devices, etc. For purposes of illustration with respect to sail or power boat electrical system, terminal 23 will be referred to as the "electronic equipment" terminal, and terminal 24 will be referred to as the "engine starter" terminal. This means that terminal 23 through lead wiring 39 is connected to a distribution panel connecting power to the electronic equipment mentioned above; and terminal 24 through lead wiring 40 is connected to the engine starting motor. Terminals 26 and 28 are input terminals bringing electric power from two separate banks of D.C. batteries into the switch of this invention. In the switch illustrated in FIG. 1, terminals 25 and 26 are connected in parallel by means of bus bar 29, of a size compatible with the current rating of the switch, to Bank A of D.C. batteries and terminals 27 and 28 are connected in parallel by means of bus bar 30 to Bank B of D.C. batteries. Bus bars 29 and 30 (FIG. 1) permit each pair of input terminals 25 and 26 or 27 and 28, to function as a common pair. Bus bars 29 and 30 are located wherever convenient to connect two input terminals, but preferably are embedded in base member 31 and are heavy enough to safely carry the current passing through the switch. Banks A and B preferably have the same number of batteries of the same size so that each of Bank A and Bank B may be used for any power needed on the boat. It is entirely possible, however, for Banks A and B to be of two different numbers of batteries or different ampere-hour ratings although all batteries should be of the same voltage. It will be seen that in the embodiment shown in FIG. 1, the contacts of output terminals 23 and 24 are long enough to contact both inner ring 83 and outer ring 84, while input terminals 25, 26, 27 and 28 are shorter in length and are capable of contacting only outer ring 84. Since outer rings 84 are fashioned with cut-out portions 45, it is clear that as disc 20 is rotated there are positions where any one or more of input terminals 25, 26, 27, and 28 are positioned at a cut-out portion 45 and is therefore incapable of being a part of a circuit carrying electricity through plate portion 20L or 20R. It is by selection of the positions of cut-out portions and the rotational position of plate members 20L and 20R that selected and different circuits may be achieved through the switch of this invention to deliver power from either Bank A or Bank B to the electronic equipment and simultaneously deliver isolated power from either Bank B or Bank A, respectively, to the engine starting motor of a boat. Other selections permit the use of the combined power of both of Banks A and B to the engine starter and to the electronic equipment; or Bank A or B to both engine starter and electronic equipment, in case one bank fails.

Top cover 32 is fitted with a dial 33 marked with different circuits labeled "OFF", "RUN 1", "ALL", "RUN 2", "BOTH 2" and "BOTH 1" and a pointer 34 to indicate the exact position of disc 20 to provide a particular desired circuit. It is, of course, only illustrative to use these terms, since any selected terms may be used for the different combinations of power. It also is preferred (not illustrated in the drawings) that each indexed position be accompanied by an appropriate detent, catch, click or the like to indicate the exact position of pointer 34 for a selected power circuitry. This will be explained in more detail below.

In FIG. 3 there is shown the detail of a terminal and its surrounding components. In this illustration the terminal 24 and the plate portion 20R are engaged as in a knife blade switch with portion 20R squeezed between two contact fingers of terminal 24 providing conductive surface contact oh both faces of plate member 20R. The pressure of squeezing is provided by spring 36 on a guide rod 37, which is permanently affixed to the inside of top cover 32 of the housing. There will, of course, be a similar spring 36 and guide rod 37 for each of terminals 23–28. Suitable means must be used to design the contact fingers of the terminal to receive plate 20R readily, such as by tapering the edges of the contact fingers of terminal 24 or the edges of the cut-out portions 45 of plate 20R or by employing stops 92 which will prevent the spring loaded faces of the terminal from closing tightly against each other when plate 20R is not between those faces. One design of this type is shown in FIG. 3 where stops 92 provide this feature. Lead wiring 40 is conductively attached to terminal 23 through a suitable terminal lug nut and bolt connection 93 sized for appropriate current carrying capacity as is well known in the art. Central disc 21, housing bass 31, and clamping ring 22 are all insulators, thus, preventing the escape of any electricity from plate member 20R. Rivet 46 or other suitable fastening means connects plate member 20R to disc 21 and clamping ring 22 without any short circuit possibility.

Figure 4:
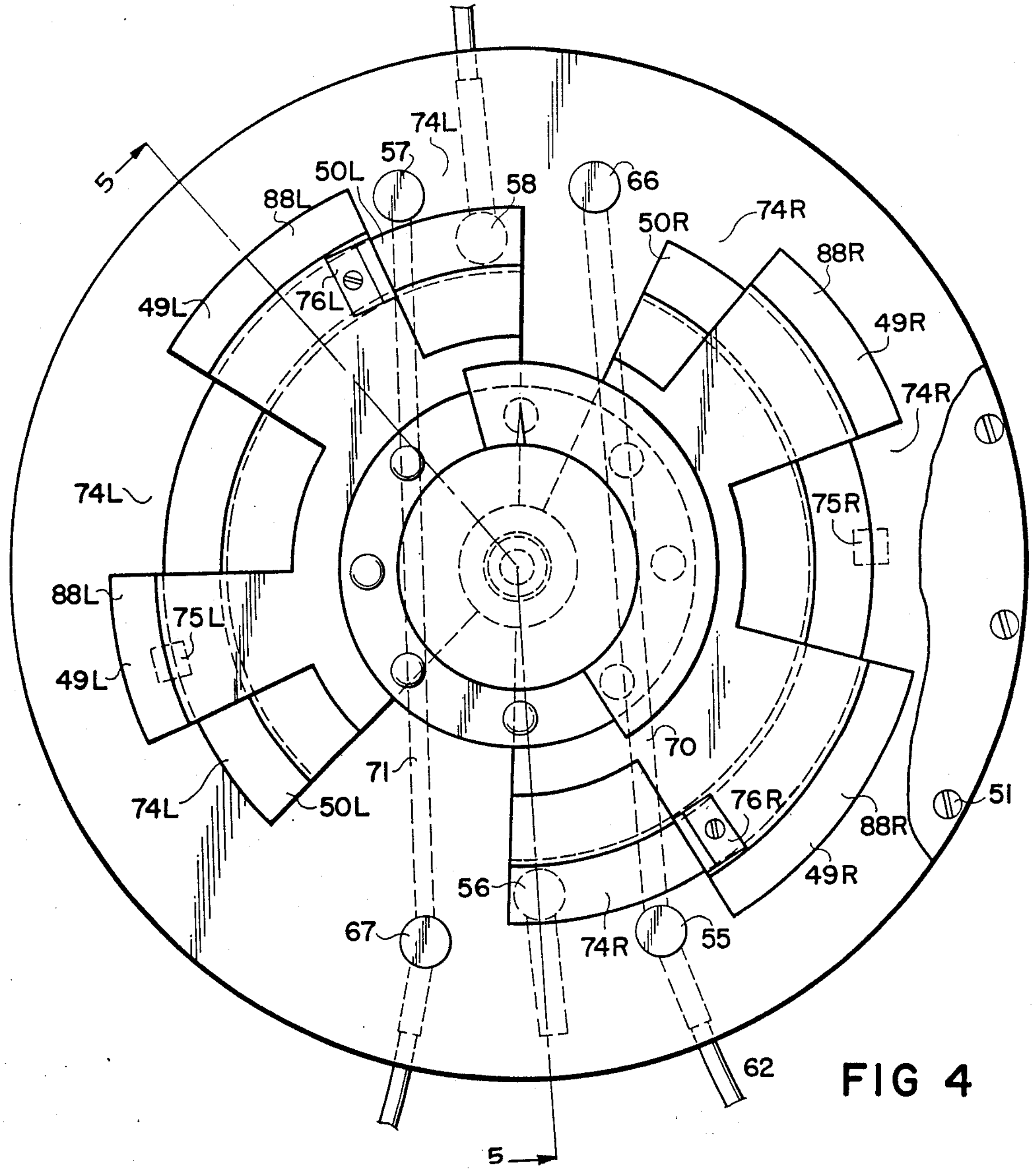
FIG. 4 is a top plan view of a second embodiment of this invention.
Figure 5:
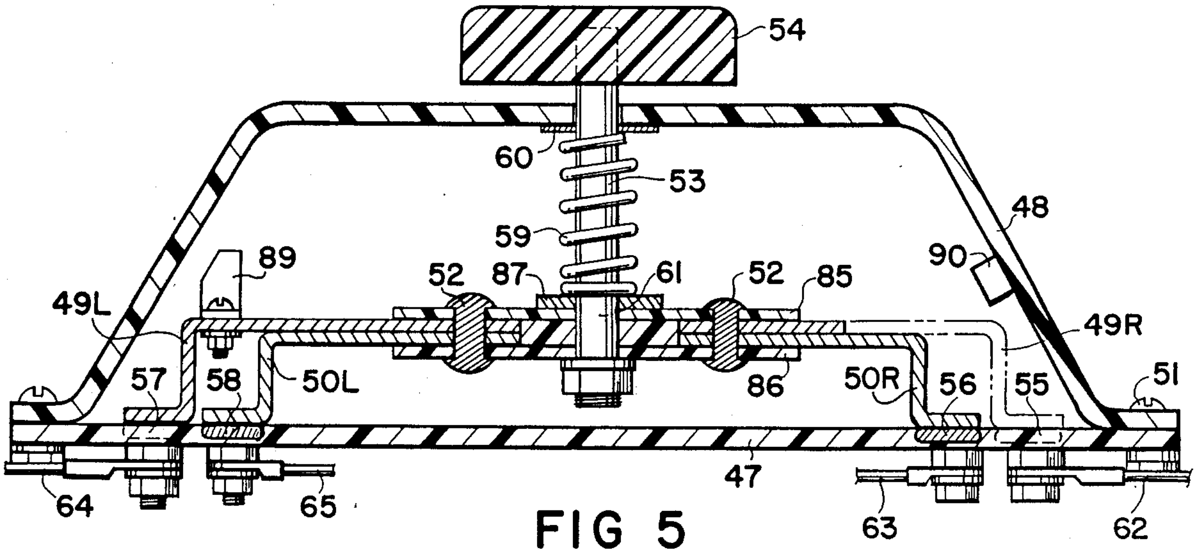
FIG. 5 is a cross sectional view taken at 5—5 of FIG. 4.

In FIGS. 4 and 5 there is shown a second embodiment of this invention which differs in structure from that of FIGS.. 1–3 but involves the same principle of operation. A nonconductive housing base 47 and a housing top cover 48 are joined around a circumferential flange by screws and nuts 51 or other suitable fastening means. Inside the housing is a rotatable conductive structure including conductive legs 49L, 49R, 50L and 50R; central supporting disc 87, rivets 52, shaft 53, and spring 59. This structure is turned manually by knob 54 between stops 89 and 90 (L and R) and includes a detent means at each position.

Input terminals 55 and 67 lead electricity from Bank A and Bank B of D.C. batteries into the switch. Input terminals 57 and 66 are positioned to contact the foot of leg 49L; and input terminals 55 and 67 are positioned to contact the foot of leg 49R. Legs 49L and 50L are electrically connected to each other as are legs 49R and 50R although legs 49L/50L are insulated from legs 49R/50R. As in the first embodiment of FIGS. 1-3 input terminals 57 and 67 are connected by a bus bar 71; and input terminals 55 and 66 are connected by a bus bar 70; bus bars being of a suitable size for carrying the current through the switch. Output terminal 58 is the "electronic equipment" terminal which is positioned to contact the foot of leg 50L. Output terminal 56 is the "engine starter" terminal which is positioned to contact the foot of leg 50R. Legs 50L and 50R are continuous from one end to the other, which is a little short of a semicircle. Legs 49L and 49R are discontinuous with cut-out portions 74L and 74R between solid sectors 88L and 88R. As plates 49 and 50 rotate, feet of legs 49L and 49R make electrical contact with terminals 55, 57, 66 and 67 when solid sectors 88L and 88R are aligned with the terminals, and they do not make electrical contact when cut-out portions 74L and 74R are aligned with the terminals. Thus, output terminals 56 and 58 are always in contact with the feet of legs 50R and 50L, respectively. Input terminal 55, 57, 66 and 67 are sometimes in contact with the feet of legs 50R and 50L. The exact positioning of terminals 55, 56, 57, 58, 66 and 67 and the exact positioning of the edges of the feet of legs 49 and 50 in solid sectors 88 are matched so that as plates 49 and 50 are rotated the leading edge of sectors 88 (L or R) makes contact with the next input terminal 55, 57, 66 or 67 before the trailing edge leaves the preceding input terminal. This principle of make-before-break in both embodiments will assure that no electronic equipment will be without power for even a fraction of a second nor will it be damaged, when switching to a new circuit arrangement. It is also important that in each embodiment (FIGS. 1-3 and FIGS. 4-5) the housing cover 32 and 48, respectively, is tightly closed against the housing base 31 and 47, respectively, in order to provide a vapor proof switch to protect against the possibility of sparks igniting an atmosphere containing fuel vapors. Generally a gasket (not shown) will be employed around the perimeter flange where the housing components are fastened together with screws and nuts 38 and 51, respectively. The thickness of the rotating plates and all terminals must be great enough to carry D.C. currents of 50-750 amps at voltages of 5-50 volts. Copper plate having a thickness of 0.05 to 0.25 inch is generally suitable for this purpose.

Figure 6:
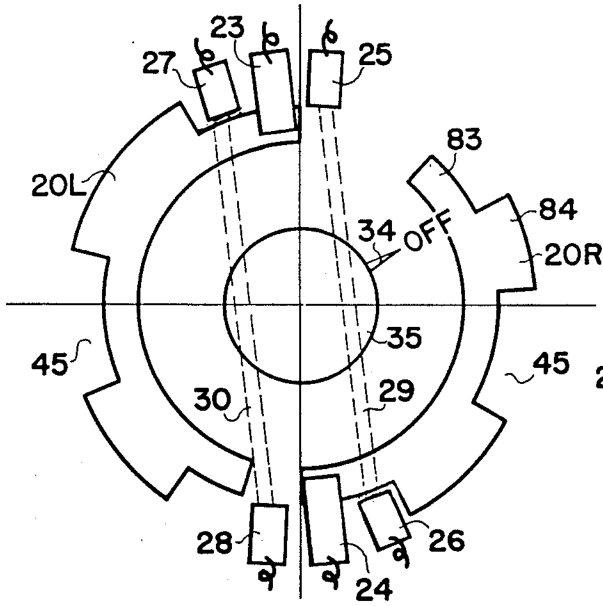
FIG. 6 is a schematic view of the conductor plate portions in the "OFF" position.

FIGS. 6-11 show in a schematic fashion how the switch can be rotated in the direction of arrow 91 to six different positions to utilize the power of Bank A and Bank B of batteries to service an engine starter motor and a power distribution panel leading to several electronic appliances. In FIG. 6, the switch is in the OFF position. "Engine starter" output terminal 24 is in contact with plate 20R and "electronic equipment" output terminal 23 is in contact with plate 20L. All input terminals 25, 26, 27 and 28, however, are not in contact with plate 20L or 20R and, accordingly, no circuit is complete.

Figure 7:
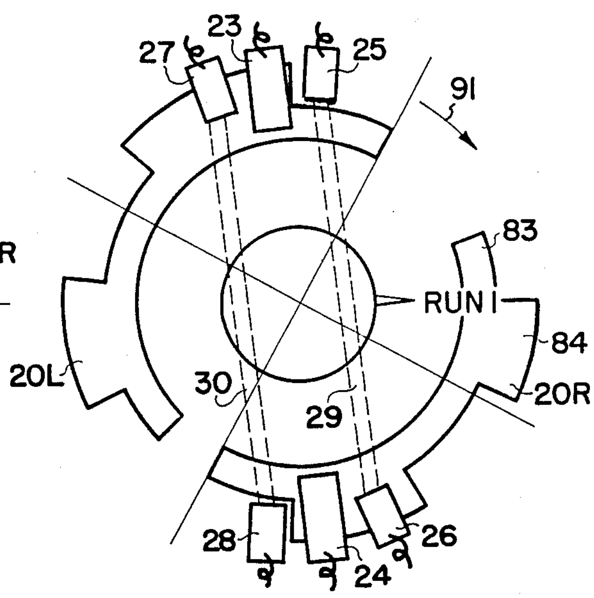
FIG. 7 is a schematic view of the conductor plate portions in the "RUN 1" position.
Figure 9:
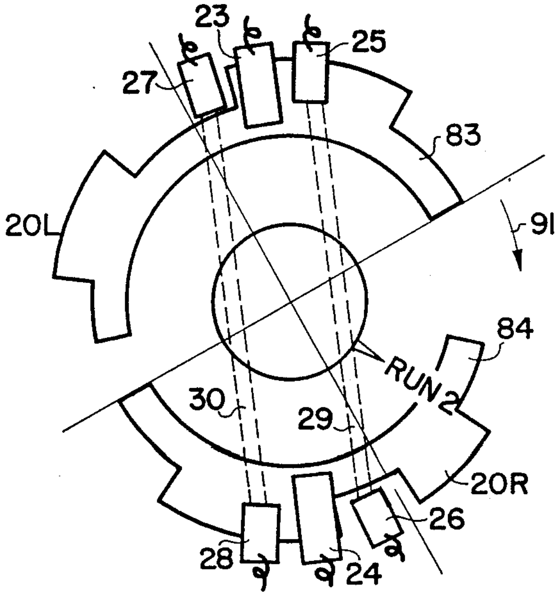
FIG. 9 is a schematic view of the conductor plate portions in the "RUN 2" position.

In FIG. 7 the switch is in the RUN 1 position. Input terminal 26 from Bank A of batteries is in contact with plate 20R while terminal 25 also connected by bus bar 29 to Bank A is not in contact with plate 20L. Terminal 27 from Bank B of batteries is in contact with plate 20L while terminal 28, also connected by bus bar 30 to Bank B is not in contact with plate 20L. Accordingly, power from Bank A enters through input terminal 26 and leaves through output terminal 24 to be used in starting the engine; while power from Bank B enters through input terminal 28 and is carried by bus bar 30 to terminal 27 and leaves through output terminal 23 to energize the electronic equipment. The arrangement in FIG. 9 is in the RUN 2 position. This is exactly the opposite of RUN 1. Here, Bank B is used to start the engine through input terminal 28, plate 20R, and output terminal 24; while Bank A is used to energize the electronic equipment through input terminal 26 and through bus bar 29 to terminal 25 to plate 20L and output terminal 23.

Figure 8:
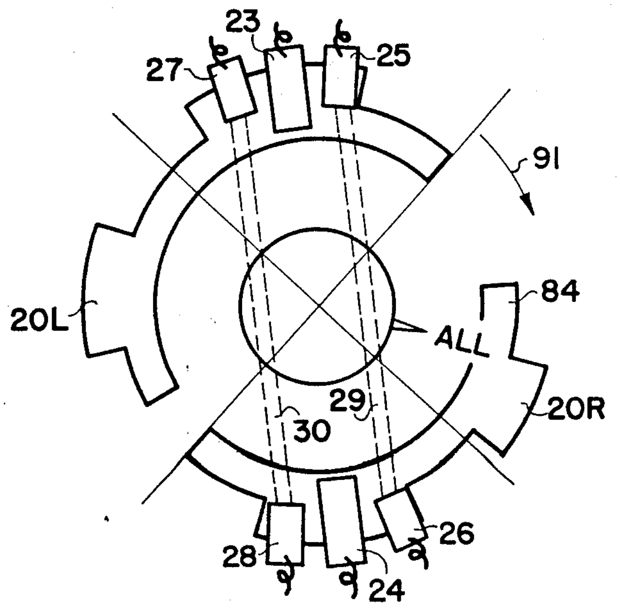
FIG. 8 is a schematic view of the conductor plate portions in the "ALL" position.

In FIG. 8 the switch is in the ALL position. This position is not consistent with the isolation features of the normal operating positions, but it may be needed when extra starting power is needed for the engine, and it can also be used when charging both banks of batteries after the engine is running. Both Bank A and Bank B are connected through input terminals 28 and 26 through bus bars 30 and 29 to input terminals 27 and 25, respectively, to both output terminals 23 and 24.

Figure 10:
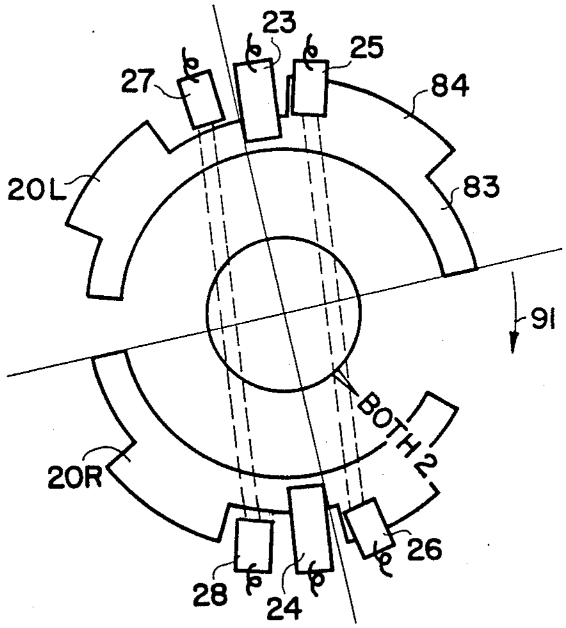
FIG. 10 is a schematic view of the conductor plate in the "BOTH 2" position.
Figure 11:
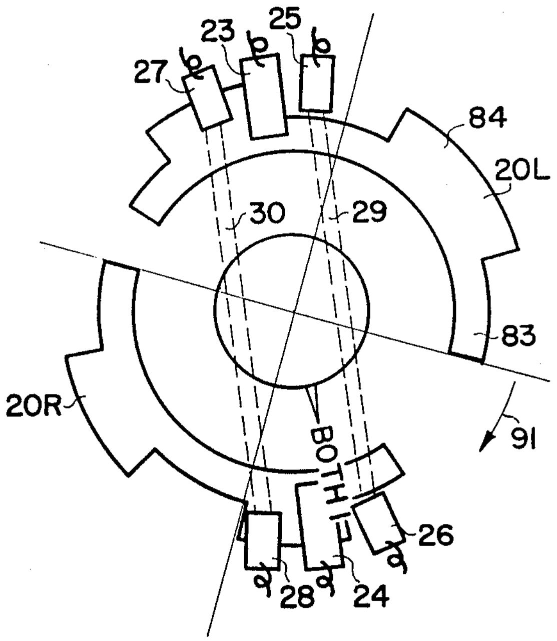
FIG. 11 is a schematic view of the conductor plate portions in the "BOTH 1" position.

In FIG. 10 the switch is in the BOTH 2 position. Power input is solely from Bank A through terminals 26 and bus bar 29 to terminal 25 to be used for both the services of starting the engine through terminal 24 and for the electronic equipment through terminal 23. Bank B is out of use entirely. In FIG. 11 there is shown the reverse of FIG. 10. Here Bank B has an input at terminal 28 and through bus bar 30 to terminal 27 and serves both to start engines through terminal 24 and to energize the electronic equipment through terminal 23, while Bank A is not in use because neither of input terminals 25 and 26 is connected into a circuit. The switch in the positions shown in FIGS. 10 and 11 would normally be used in an emergency situation when either Bank A or B failed. The switch does not provide a position where both Bank A and Bank B direct their combined power solely to a single power consumption device while leaving the other power consumption device devoid of any power.

It is, of course, contemplated that this same arrangement, although somewhat more complex, can be employed to connect more than two banks of batteries, or other power sources, to more than two power consumption centers.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An electric vapor-proof, spark-proof, switch having two pair of current input terminals and of two current output terminals comprising a vapor-proof, electrically nonconductive housing enclosing a rotatable insulated disc having two current conductive plates attached thereto and insulated from each other each said pair of stationary current input terminals selectively engagable or disengagable with one said plate respectively of selected rotational positions of said disc; and the two said terminals of each said pair being electrically conductively connected to each other and insulated from the other said pair said two stationary said current output terminals each being continuously engagable with one of said plates respectively, an indicator outside of said housing to identify positions of said disc wherein selected input terminals are electrically connected to one of said output terminals, and a means outside of said housing for rotating said disc to any of said positions.

2. The switch of claim 1 wherein said disc has affixed thereto two electrically conductive arcuate plates isolated from each other and is shaped with cut-out portions positioned to prevent electrical contact with selected ones of said input terminals at said positions of said disc.

3. The switch of claim 2 wherein said disc comprises two substantially semi-circular plates rigidly mounted on a signal rotatable central member turnable about an axis passing through the center of the member and perpendicular thereto, and said cut-out portions have the shape of truncated sectors of a circle.

4. The switch of claim 1 wherein said disc includes a rigid central nonconductive member with two conductive plates insulated from each other and affixed thereto and each said terminal comprises an electrically conductive metal member pressed against one of said plates to provide a sliding electrically conductive contact therewith.

5. The switch of claim 4 wherein each said terminal comprises two opposing metal contact fingers pressing against opposite sides of one of said plates.

6. The switch of claim 1 wherein said plates and said terminals are so positioned that as said disc is rotated from contact with one terminal to contact with a second terminal accompanied by breaking contact with said one terminal, the contact with said second terminal is made before breaking contact with said one terminal.

7. The switch of claim 1 which includes stop members to prevent said disc from rotating beyond the last of said identified positions in each rotational direction, respectively.

8. The switch of claim 1 which provides a selective means to direct isolated electrical power from either of two separate battery power sources to either or both of two separate power consumption devices, or from both of two separate battery power sources to both of two separate power consumption devices.

9. A vapor-proof electric switch selectively interconnecting either or both of a first and a second independent source of D.C. battery power to a first and a second independent D.C. power consumption system, said switch comprising a rotatable disc member having two separate electrically conductive plates adapted to provide electrically conductive sliding surface contact, respectively, with a first and a second stationary electrical input terminal, respectively, connected to said first and second independent sources of D.C. battery power; said conductive plates simultaneously being in continuous sliding contact with a first and a second stationary electrical output terminal, respectively, connected to said first and second D.C. power consumption systems, said conductive plates having spaced around their respective perimeters selected rotational positions of said cut-out portions where there is no electrically conductive sliding contact between said plate and one or more of said input terminals; said two conductive plates being electrically insulated from each other.

10. The switch of claim 9 which includes four of said input terminals in sliding contact with said plates and spaced around said disc; two of which are connected to each other by a first bus bar and further connected to said first source of D.C. battery power and the other two of which are connected to each other by a second bus bar and further connected to said second source of D. C. battery power.

11. The switch of claim 9 wherein said cut-out portions of said conductive members are of such position, size and shape that the rotation of said disc makes contact with each succeeding one of said terminals before breaking contact with each preceding terminal.

* * * * *